United States Patent
Ivanov et al.

(10) Patent No.: US 12,094,034 B1
(45) Date of Patent: Sep. 17, 2024

(54) SYSTEM AND METHOD FOR FACE RECONSTRUCTION FROM A VOICE SAMPLE

(71) Applicant: Corsound AI Ltd, Tel Aviv (IL)

(72) Inventors: Daniil Ivanov, Tel Aviv (IL); Arkady Krishtul, Tel Aviv (IL)

(73) Assignee: CORSOUND AI LTD., Tel Aviv (IL)

( * ) Notice: Subject to any disclaimer, the term of this patent is extended or adjusted under 35 U.S.C. 154(b) by 0 days.

(21) Appl. No.: 18/462,523

(22) Filed: Sep. 7, 2023

(51) Int. Cl.
| | |
|---|---|
| G06T 11/60 | (2006.01) |
| G06T 11/00 | (2006.01) |
| G10L 15/22 | (2006.01) |
| G10L 17/02 | (2013.01) |
| G10L 17/06 | (2013.01) |

(52) U.S. Cl.
CPC .............. G06T 11/00 (2013.01); G10L 17/02 (2013.01); G10L 17/06 (2013.01)

(58) Field of Classification Search
CPC .......... G06T 11/60; G10L 17/06; G10L 15/22
See application file for complete search history.

(56) References Cited

U.S. PATENT DOCUMENTS

| | | | | |
|---|---|---|---|---|
| 2008/0126426 | A1* | 5/2008 | Manas | G06Q 30/02 |
| 2018/0226079 | A1* | 8/2018 | Khoury | G06F 21/32 |
| 2020/0051565 | A1* | 2/2020 | Singh | G10L 21/10 |
| 2021/0209423 | A1* | 7/2021 | Yao | G06V 40/168 |
| 2022/0116415 | A1* | 4/2022 | Burgis | H04L 67/51 |

OTHER PUBLICATIONS

Seibold et al; Detection of Face Morphing Attacks by Deep Learning; Jan. 2023.
Xiong et al: Voice-Face Cross-modal Matching and Retrieval: A Benchmark, ;https://doi.org/10.48550/arX1iv.1911.093338, Dec. 30, 2019.
Bai et al; Speaker Recognition Based on Deep Learning: An Overview; Apr. 6, 2021.
Duarte et al; WAV2PIX: Speech-Conditioned Face Generation Using Generative Adversarial Networks; https://imatge-upc.github.io/wav2pix/;Mar. 25, 2019.
Tae-Hyun Oh et al; Speech2Face: Learning the Face Behind a Voice, MIT CSAIL; http:/speech2face, github.io; May 23, 2019.
Wen et al; Reconstructing faces from Voices, May 31, 2019.
Boutros et al; Self-restrained triplet loss for accurate masked face recognition; 0031-3203/© Elsevier Ltd; Pattern Recognition 124 (2022) 108473.
Wang et al; Learning Discriminative Joint Embeddings for Efficient Face and Voice Association; Jul. 25-30, 2020; Virtual Event, China; in Proceedings of the 4rd International ACM SIGIR Conference on Research and Development in Information Retrieval; SIGIR '20; pp. 1881-1884.

(Continued)

*Primary Examiner* — Yi Yang
(74) *Attorney, Agent, or Firm* — PEARL COHEN ZEDEK LATZER BARATZ LLP (57) ABSTRACT

System and method for reconstructing a facial image of a speaker from a voice sample of the speaker including: selecting, from a dataset associating each of a plurality of voice samples to a particular facial image, a subset of voice samples that are similar to the voice sample of the speaker, and reconstructing the facial image of the speaker by unifying the faces associated with each of the voice samples in the subset of voice samples.

10 Claims, 7 Drawing Sheets

(56) References Cited

OTHER PUBLICATIONS

Duarte et al; Wav2pix: Speech-Conditioned Face Generation Using Generative Adversarial Networks; https://imatge-ups.glthub.io/way2pix; Mar. 25, 2019.
Wen et al; Disjoint Mapping Network for Cross-modal Matching of Voices and Faces; Jul. 16, 2018.
Speaker Verification with ECAPA-TDNN embeddings on Voxceleb Mar. 19, 2023.
Bai et al; Speaker Recognition Based on Deep Learning: An Overview, Apr. 4, 2021.
Speaker Verification with xvector embeddings on Voxceleb, Mar. 19, 2023.
Schroff et al; FacNet A Unified embedding for face recognition and clustering, arXiv:1503.03832v3; 4, Jun. 17, 2015.
Chung et al; Lip Reading Datasets.
Chung et al; TheVoxCeleb2 Dataset; VoxCeleb2: Deep Speaker Recognition, Interspeech 2018.
Nagrani et al; Seeing Voices and Hearing Faces: Cross-model biometric matching, https://doi.org/10.48550/arXiv.1804.00326, Apr. 3, 2018.
Nagrani et al; Learnable PINs: Cross-Modal Embeddings for Personal Identity, https://doi.org/10.48550/arXiv.1805.00833, Jul. 26, 2018.
Hoffer et al; Deep Metric Learning Using Triplet Network, Department of Electricl Engineering, Technion Israel Institute of Technology, Dec. 2018.
Wang et al; Additive Margin Softmax for Face verification, IEEE Signal Processing Letters, vol. 25 Issue: 7 pp. 926-930, May 30, 2018.

\* cited by examiner

SYSTEM AND METHOD FOR FACE RECONSTRUCTION FROM A VOICE SAMPLE

FIELD OF THE INVENTION

The present invention relates generally to reconstructing a face from a voice sample.

BACKGROUND

It has been shown experimentally that human appearances are associated with their voices. Specifically, some research suggests that there may be a connection between voice characteristics and the appetence of the speaker face. For example, properties like age, gender, ethnicity, and accent may influence both the facial appearance and the voice. In addition, there exist other, more subtle properties that influence both the facial appearance and voice, such as the level of specific hormones, the shape of the mouth, facial bone structure, thin or full lips or the mechanics of speech production, which may affect both the sound of the voice and the visual appearance of the face.

SUMMARY

According to embodiments of the invention, a computer-based system and method for reconstructing a facial image of a speaker from a voice sample of the speaker may include: selecting, from a dataset associating each of a plurality of voice samples to a particular facial image, a subset of voice samples that are similar to the voice sample of the speaker; and reconstructing the facial image of the speaker by unifying the faces associated with each of the voice samples in the subset of voice samples.

According to embodiments of the invention, unifying the faces may be performed using a face fusion model.

According to embodiments of the invention, selecting may include: generating a voice signature of the speaker from the voice sample of the speaker and for each of the plurality of voice samples in the dataset; calculating a plurality of similarity measures, each between the voice signature of the speaker and one of the voice signatures of the plurality of voice samples in the dataset; and selecting the subset of voice signatures based on the similarity measures.

According to embodiments of the invention, the similarity measure may be cosine similarity.

According to embodiments of the invention, selecting the subset of voice signatures based on the similarity measures may include selecting the voice signatures with a similarity measure that satisfies a threshold.

According to embodiments of the invention, the voice signature may be generated by a pretrained speaker recognition model.

According to embodiments of the invention, selecting the subset of voice signatures based on the similarity measure may include ordering voice signatures based on the similarity measure and selecting the highest voice signatures.

According to embodiments of the invention, a computer-based system and method for reconstructing a facial image of a speaker from a voice sample of the speaker, may include: using a voice-face matching model, selecting from a dataset of facial images, a subset of facial images that were associated by the voice-face matching model with the voice sample of the speaker with the highest matching scores; and reconstructing the facial image of the speaker by unifying the facial images in the subset.

According to embodiments of the invention, the voice-face matching model may include an existing network trained to calculate a rank indicative of a probability that the voice sample and a facial image belong to the same person.

According to embodiments of the invention, the voice-face matching model may generate a facial latent space vector for each facial image in the dataset of facial images, and a voice latent vector for the voice sample of the speaker; calculate a similarity measure between each of the facial latent space vectors and the voice latent vector; and provide each of the similarity measures as the matching score of the facial image associated with the facial latent space vector for which the similarity measure was calculated.

According to embodiments of the invention, unifying the facial images in the subset may be performed using a face fusion model.

According to embodiments of the invention, selecting the subset of facial images may include selecting the facial images with matching scores above a threshold.

According to embodiments of the invention, selecting the s subset of facial images may include ordering the facial images based on the matching scores and selecting matching scores with the highest matching scores.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanying drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may provide a system and method for creating, generating, or reconstructing a facial image of a speaker from a sample of the speaker's voice, e.g., estimating the appearance of a face of a person from an audio recording of the person speaking. A facial image may refer to a digital image of the face. Embodiments of the invention may find, e.g., in a voice-face dataset, voice samples that are similar to the speaker's voice, and may reconstruct the speaker face based on the faces associated with the similar voice samples. For example, those faces may be unified, e.g., by face morphing, face fusion or face averaging techniques as known in the art.

Some practical applications examples of face reconstruction from a voice sample may include criminal investigations where a sample of the voice is the only evidence. For example, a face of a suspect may be reconstructed from the voice sample and may assist in the investigation. Another application may include generating a visual representation of a person during a videoconferencing call, when the speaker does not share his/her picture. While embodiments of the invention may not recover the exact apperence of the speaker face, embodiments of the invention may provide a facial image that captures the main facial traits of the speaker such as age, gender and some dominant visual attributes.

Some components used for the facial reconstruction, according to embodiments of the invention, e.g., one or more of the voice signature generation module, the comparison module and the face fusions module, may include one or more neural networks (NN). NNs are computing systems inspired by biological computing systems, but operating using manufactured digital computing technology. NNs are mathematical models of systems made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning or training proceeds typically using a loss function. The weight increases or decreases the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning using a loss function.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example time delay neural network (TDNN) which is a multilayer artificial neural network that can be trained with shift-invariance in the coordinate space. Generative adversarial network (GAN) include two NN that compete with each other by using deep learning methods to become more accurate in their predictions. In practice, an NN, or NN learning, may be performed by one or more computing nodes or cores, such as generic central processing units or processors (CPUs, e.g., as embodied in personal computers) or graphics processing units (GPUs), which can be connected by a data network.

The source facial images from which output faces are generated, created, constructed or reconstructed may be provided in any applicable computerized image format such as joint photographic experts group (JPEG or JPG), portable network graphics (PNG), graphics interchange format (GIF), tagged image file (TIFF), etc., and the voice or speech sample may be provided in any applicable computerized audio format such as MP3, MP4, M4A, WAV, etc.

The voice sample may be provided to a voice model, also referred to as a voice signature generation network that may generate a voice signature, in a feed forward process, for the voice sample. As used herein, the voice signature, also referred to as a voice latent space vector, a feature vector, a representation, an embedding, may include a reduced dimension (e.g., compressed) representation of the original data, generated for example by a machine learning (ML) model or an encoder. The signature or feature vector may include a vector (e.g., an ordered list of values) that represent the original data in a compressed form that, if generated properly, includes important or significant components or characteristics of the raw data. An example for a voice signature may include any type of an i-vector or x-vector that is known in the art and commonly used for voice biometrics.

Embodiments of the invention may further calculate a measure of similarity (which may be an inverse of the distance) between the voice sample of the speaker and voice samples of other persons, and may use facial images of persons having voices that are similar to the voice of the speaker to reconstruct the face of the speaker. The measure of similarity may include cosine similarity, an inverse of the Euclidian distance, and any other measure of similarity.

Reconstructing, generating or creating a facial image of a speaker based on a sample of his/hers voice according to embodiments of the invention usually requires a large amount of voice-image pairs that include at least one speech sample and at least one matching face image (voice and images of the same person). Datasets that include such voice-image pairs may be used. A popular dataset for this task is the VoxCeleb2 dataset, a dataset of over 1 million utterances for about 6,000 celebrities, extracted from videos uploaded to the YouTube service. Other datasets may include the AVSpeech and the VGG lip reading datasets. The dataset may include pairs of audio recordings of the voice of a person matched with at least one image of the person. For example, the voice sample and the at least one image may be extracted from a single video using known in the art techniques. Other datasets associating people's faces to their voice may be used, e.g., for different ages, ethnicities, nationalities, languages, etc.

Embodiments of the present invention may improve on prior methodologies for reconstructing facial images of a speaker form a voice sample of the speaker. These prior systems typically use ML models such as GANs, that are trained to reconstruct a facial image from a voice sample. Training such ML models typically requires providing voice samples as inputs and the associated facial images as labels. While these methods provide some results, training of such network to a sufficient level is highly complex and computationally intensive. In addition, such models will operate only for the type of faces they are trained for. Thus, using a model that was trained for one age group or ethnicity group may not work well of other age group or ethnicity. Thus, those models are not scalable.

Embodiments of the invention may provide a method for creating, generating or reconstructing facial images of a speaker form a voice sample of the speaker that does not require training a dedicated ML model. Some models may be used, e.g., for generating the voice signatures, however, such models already exist and are well trained and verified. Accordingly, embodiments of the invention may improve the technology of face reconstruction based on a speaker voice by improving the robustness and efficiency of the face reconstruction. Furthermore, embodiments of the invention may scale well for subgroup with different characteristics such as age group or ethnicity, where the only action needed for adjusting the proposed method for a certain subgroup of people is to use a voice-face dataset that includes voice-image pairs of persons that pertain to that subgroup.

Figure 1:
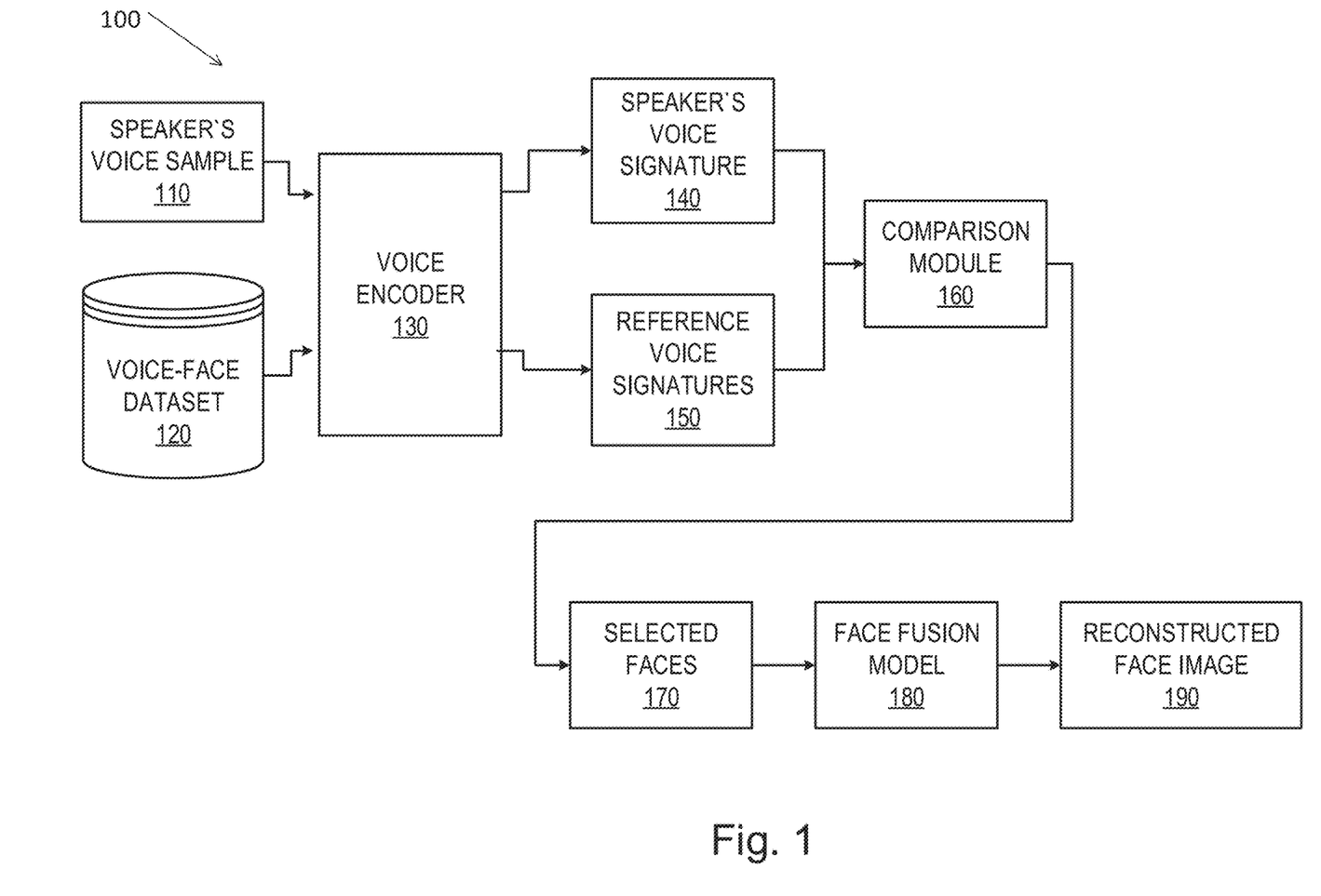
FIG. 1 depicts a system for reconstructing a facial image of a speaker from a sample of the speaker's voice, according to embodiment of the invention.
Figure 7:
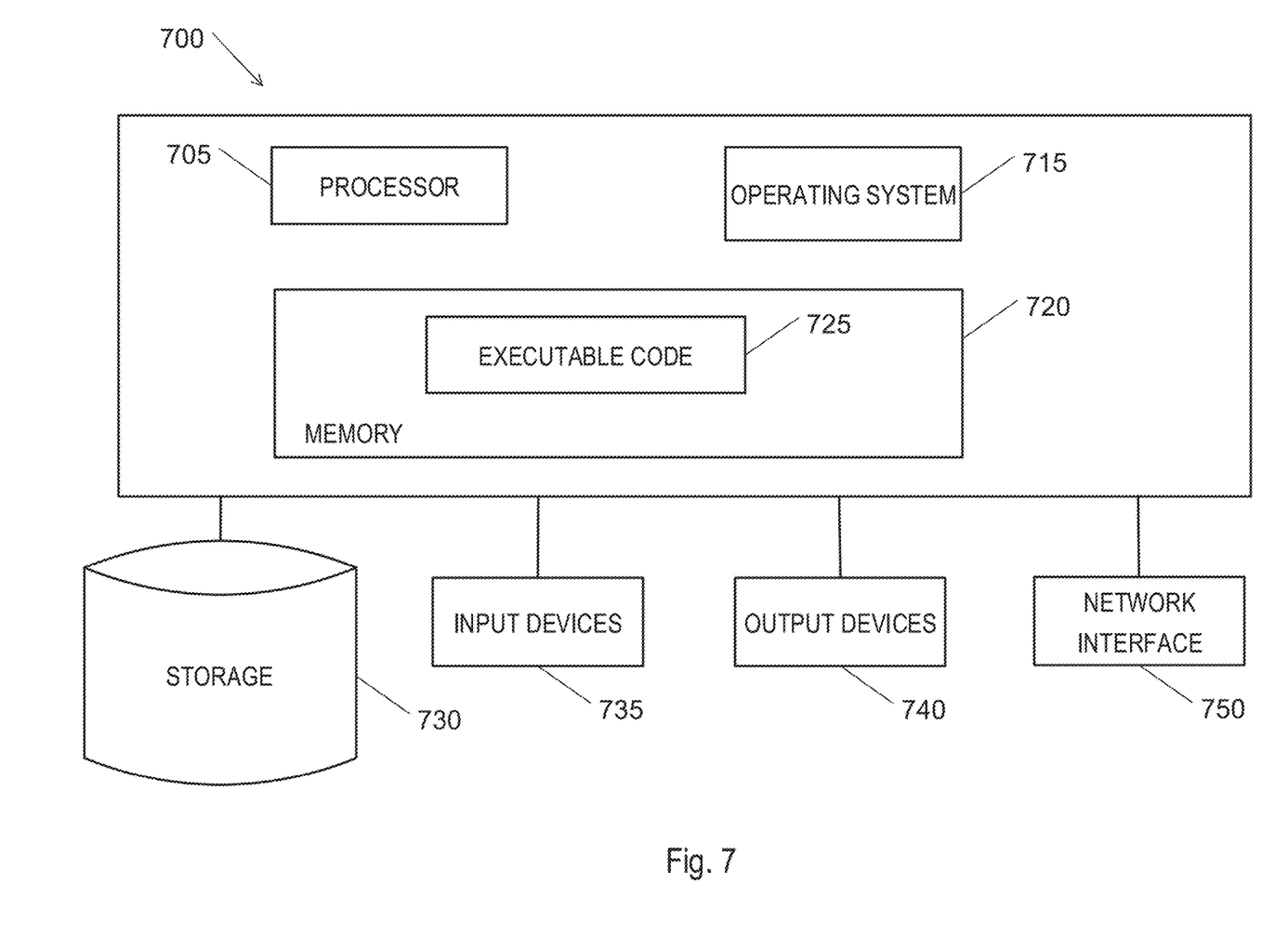
FIG. 7 shows a high-level block diagram of an exemplary computing device which may be used with embodiments of the present invention.

FIG. 1 depicts a system 100 for creating, generating, or reconstructing a facial image of a speaker from a sample of the speaker's voice, according to embodiment of the invention. It should be understood in advance that the components, and functions shown in FIG. 1 are intended to be illustrative only and embodiments of the invention are not limited thereto. While in some embodiments the system of FIG. 1 is implemented using systems as shown in FIG. 7, in other embodiments other systems and equipment can be used.

Voice-face dataset 120 may include pairs of matching voice or speech samples and face images, e.g., voice samples and images of the same person who provided the voice or speech sample. Audio-video dataset 210 may be stored, for example, on storage 730 presented in FIG. 7. For example, the voice sample and the image may be extracted from a single video using known in the art techniques. The voice samples from dataset 200 may be referred to herein as reference voice samples. According to some embodiments, the source facial images may be selected from voice-face dataset 120 according to predetermined criteria, such as a combination of one or more of pose, lightning, size of face in the image, image quality, etc. For example, in some embodiments, only images with faces that are gazing at the camera are selected, e.g., with up to 10 degrees tilting at each dimension. Other images may be discarded. Similarly, facial images with open mouth and closed eyes may be filtered out, e.g., using an appropriate filter, so that only facial images with closed (or nearly closed) mouth and open eyes may be used. In addition, the background of the selected image may be removed.

Voice encoder 130 may include an ML model, such as an NN that may generate a voice signature from a voice sample. For example, voice encoder 130 may include speaker recognition models, voice recognition models, deep NN voice encoders, or other types of voice encoders that are pretrained to generate voice signatures that may help to distinguish speakers from each other. An example of a voice encoder 130 may include SpeechBrain's (an open-source conversational artificial intelligence (AI) toolkit) implementation of ECAPA-TDNN (emphasized channel attention, propagation and aggregation in time delay neural network), other implementations of—TDNN (time delay neural network), or x-vector encoders. Another example for voice encoder 130 may include a NN from a voice-face matching model that is used to generate voice embedding. Other preexisting or propriety voice encoders may be used. Thus, embodiments of the invention may use off-the-shelf pre-existing and already trained and verified voice encoders 130 that are originally intended for other applications such as voice recognition. Using pretrained components may dramatically reduce the computational complexity of preparing system 100, while ensuring high quality results.

Voice encoder 130 (or several instances of voice encoder 130) may generate a voice signature 140 for the speaker's voice sample 110, and reference voice signatures 150 for voice samples from voice-face dataset 120 (e.g., one reference voice signature 150 pre one voice sample from voice-face dataset 120). Voice signatures 140 and 150 may include, for example, any type of an i-vector or x-vector that is known in the art and commonly used for voice biometrics applications such as speaker recognition.

Comparison module 160 may obtain voice signatures 140 and 150 and may calculate a similarity measure between voice signature 140 and each of reference voice signatures 150 (e.g. one similarity measure for each pair of signature 140 and signature 150). Comparison module 160 may further select a subset of voice signatures from reference voice signatures 150 that are the most similar (that is equivalent to the least distant) voice signatures, based on the similarity measures. The similarity measure may include cosine similarity, Euclidian distance (or an inverse thereof), or any other suitable measure of similarity. In some embodiments, the top N (where N is a natural number) similar reference voice signatures 150 may be selected, e.g., the N reference voice signatures 150 with the highest similarity measure (or the lowest distance metric). In some embodiments, reference voice signatures 150 with a similarity measure that satisfies a threshold may be selected e.g., a similarity measure above a threshold (or a distance metric below a threshold).

Selected faces 170, which are the facial images associated with the selected reference voice signatures, may be provided as source image input to face fusion model 180. Face fusion model 180 may generate, create or reconstruct the facial image of the speaker to generate reconstructed face image 190 by unifying or combining selected faces 170 using face morphing, face fusion or face averaging techniques as known in the art. Face morphing may refer to a process where two or more facial images are combined together to generate a single morphed image. Examples for currently available morphing tools may include MorphThing, 3Dthis Face Morph, Face Swap Online, Abrosoft FantaMorph, FaceMorpher, MagicMorph and others. Again, using already developed and validated building blocks, may enable quick implementation of embodiments of the invention, which combines known components, e.g., voice signature generation and face morphing, for achieving a new and unexpected result, e.g., reconstruction of a speaker face from a sample of the speaker voice.

Figure 2:
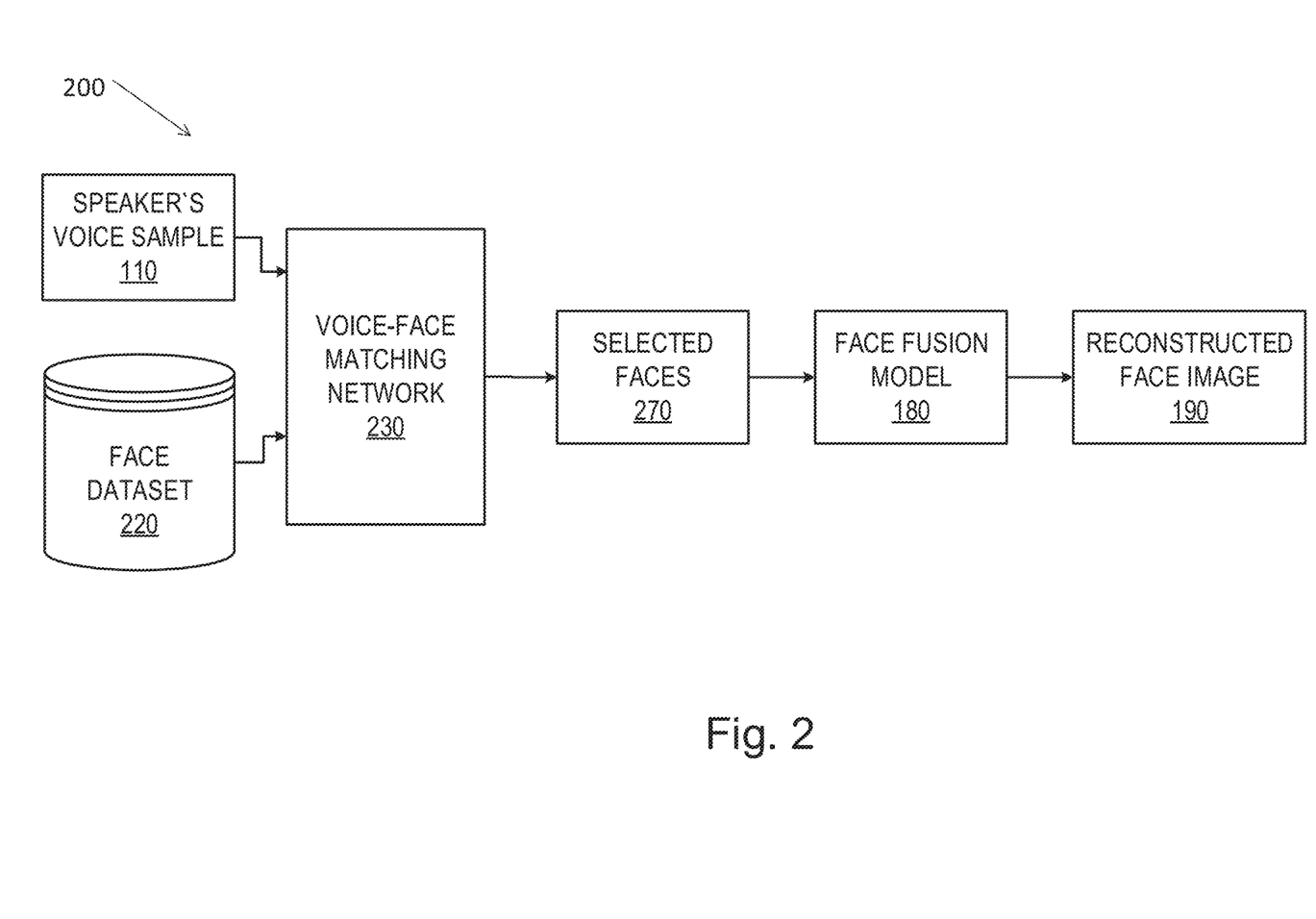
FIG. 2 depicts a system for reconstructing a facial image of a speaker from a sample of the speaker's voice using a voice-face matching network, according to embodiment of the invention.

FIG. 2 depicts a system 200 for creating, generating, or reconstructing a facial image of a speaker from a sample of the speaker's voice using a voice-face matching network, according to embodiment of the invention. It should be understood in advance that the components, and functions shown in FIG. 2 are intended to be illustrative only and embodiments of the invention are not limited thereto. While in some embodiments the system of FIG. 2 is implemented using systems as shown in FIG. 7, in other embodiments other systems and equipment can be used. Some components of system of system 200 are similar to components of system 100, those components will be given the same reference numerals and will not be described again in detail.

System 200 may include a voice-face matching network 230 that may obtain the speaker voice sample 110 and images from a facial images dataset 220. Voice-face matching network 230 may be an existing network (e.g., ML network or NN network) trained to calculate a matching rank, a score or a grade indicative of the probability that the voice sample and the facial image belong to the same person. Thus, it may be assumed that the higher the matching rank, grade or score of a facial image, the higher is the similarity between the face in the image and the real face of the speaker. The matching rank, score or grade may be used to sort a dataset 220 in order of probability that the face in the image is similar to the face of the speaker of the voice sample. Accordingly, the top ranked facial images from dataset 220, e.g., the top N ranked facial images or facial images with a matching rank that satisfies a threshold (e.g., above a threshold), may be selected. Selected facial images 270 may be provided to face fusion model 180 that may generate the reconstructed face image 190, as disclosed herein with reference to FIG. 1.

According to some embodiments, voice-face matching network 230 may generate a facial latent space vector (e.g., a representation) for facial images in dataset 220 (e.g., a facial latent space vector for each facial image), and a voice latent vector (e.g., a voice signature) for the input voice sample. The latent space vectors may include a reduced dimension (e.g., compressed) representation of the original data, e.g., facial image or voice sample, generated for example by two ML models or encoders (that are a part of voice-face matching network 230). The latent space vectors may include a vector (e.g., an ordered list of values) that represent the original data in a compressed form that, if generated properly, includes important or significant components or characteristics of the raw data. The voice-face matching network 230 may calculate a similarity measure or a matching rank, score or grade (e.g., cosine similarity or other similarity measure) between the facial latent space vector and the input voice sample. The similarity measure between the voice and image latent vectors may be the matching rank, score or grade provided by voice-face matching network 230.

Figure 3:
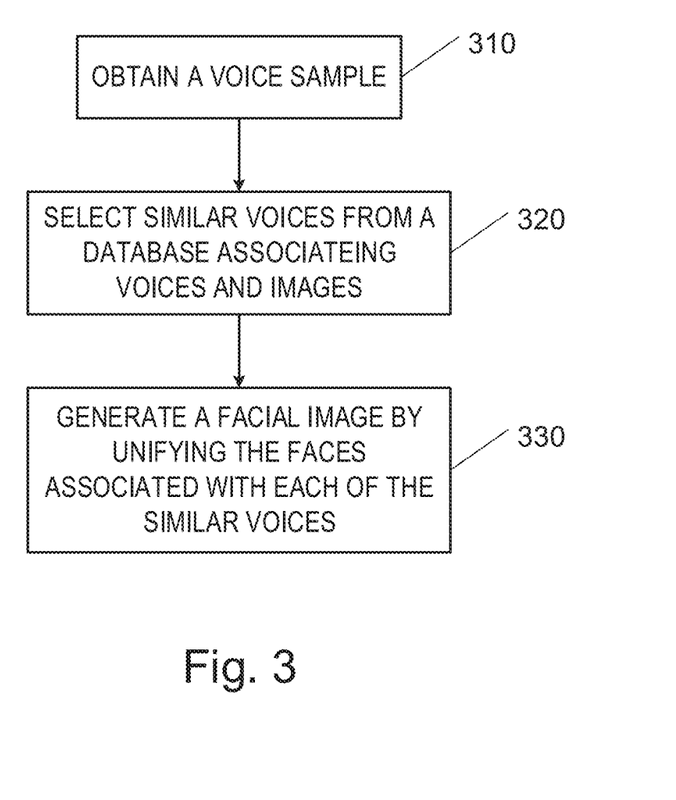
FIG. 3 is a flowchart of a method for reconstructing a facial image of a speaker from a sample of the speaker's voice, according to embodiments of the invention.

Reference is now made to FIG. 3, which is a flowchart of a method for creating, generating, or reconstructing a facial image of a speaker from a sample of the speaker's voice, according to embodiments of the invention. While in some embodiments the operations of FIG. 3 are carried out using systems as shown in FIGS. 1 and 7, in other embodiments other systems and equipment can be used.

In operation 310, a processor, e.g., processor 705 depicted in FIG. 7, may obtain a voice sample of a speaker. In operation 320, the processor may select similar voices from a database associating voices and images, e.g., voice-face dataset 120 depicted in FIG. 1. The processor may select similar voices based on voice signatures or using any other method. In operation 330 the processor may generate a facial image by unifying, e.g., using face fusion model 180 depicted in FIG. 1, the faces associated with each of the similar voices, e.g., using face fusion algorithms.

Figure 4:
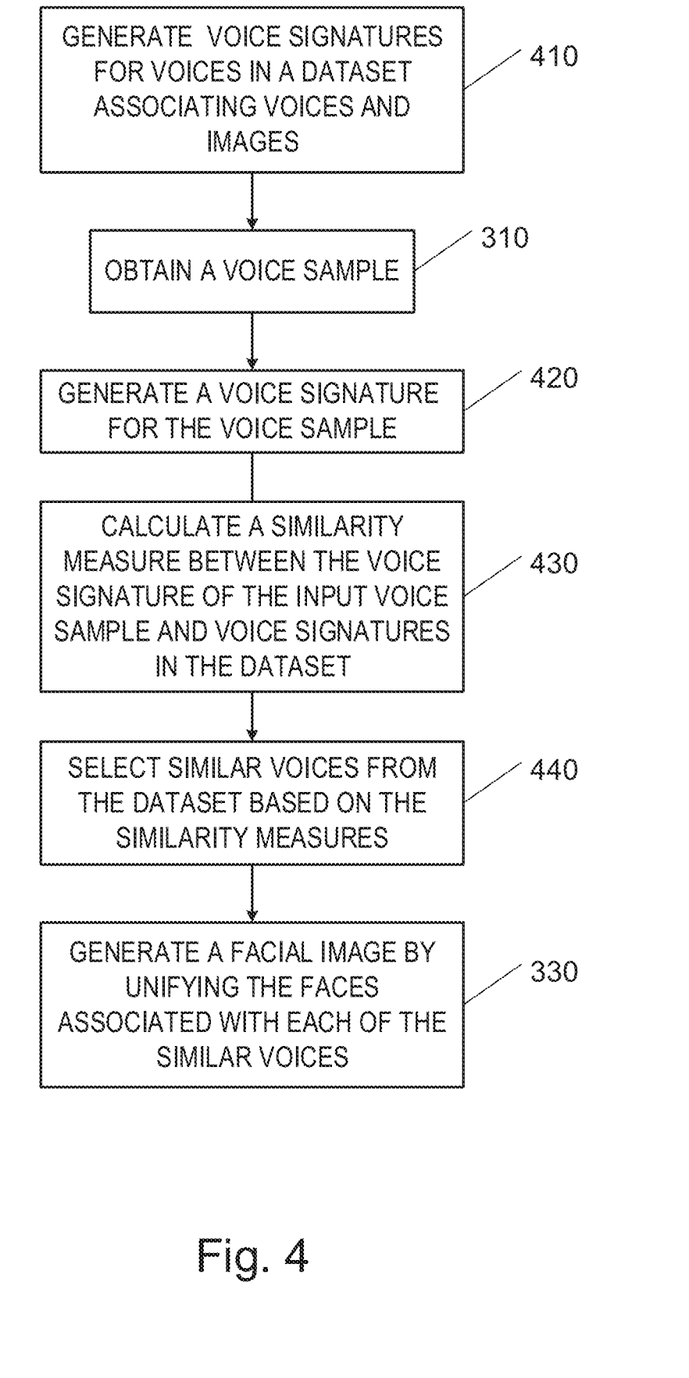
FIG. 4 is a flowchart of a method for reconstructing a facial image of a speaker from a sample of the speaker's voice using voice signatures, according to embodiments of the invention.

Reference is now made to FIG. 4, which is a flowchart of a method for creating, generating, or reconstructing a facial image of a speaker from a sample of the speaker's voice using voice signatures, according to embodiments of the invention. While in some embodiments the operations of FIG. 4 are carried out using systems as shown in FIGS. 1 and 7, in other embodiments other systems and equipment can be used. Some operations of embodiments of the method presented in FIG. 4 are similar to operations presented in FIG. 3. These operations will be given the same reference numerals and will not be described again in detail.

In operation 410, a processor, e.g., processor 705 depicted in FIG. 7, may generate voice signatures for voices in a dataset associating or linking specific voices and specific images (e.g., dataset 120 depicted in FIG. 1). For example, the voice signatures may be generated or calculated using voice encoder 130 depicted in FIG. 1. Operation 410 may be performed once per dataset, and the voice signatures may be stored together with the dataset in a storage, such as storage 730 depicted in FIG. 7. In cases where the dataset is enriched with more samples operation 410 may be repeated for the new samples. In addition, operation 410 may be repeated for new datasets, e.g., datasets with samples of other age groups of ethnicities. In operation 420, the processor may generate a voice signature for the voice sample of the speaker (obtained in operation 310), e.g., using the same voice encoder used in operation 410. In operation 430, the processor may calculate a similarity measure (or a distance metric) between the voice signature of the input voice sample and voice signatures in the dataset. For example, the processor may calculate, a cosine similarity measure or the Euclidian distance between the voice signature of the input voice sample and a voice signature in the dataset. Other distance metrics metrices may be used. In operation 440, the processor may select similar voices (e.g., voice samples with voice signatures that are similar to the voice signatures of the voice sample of the speaker) from the dataset based on the similarity measures. For example, the top N samples or voice signatures with a similarity measure that is above a threshold may be selected. In operation 330, the facial images that are associated with the selected voice samples may be unified to generate or reconstruct the facial image of the speaker or an approximation thereof.

Figure 5:
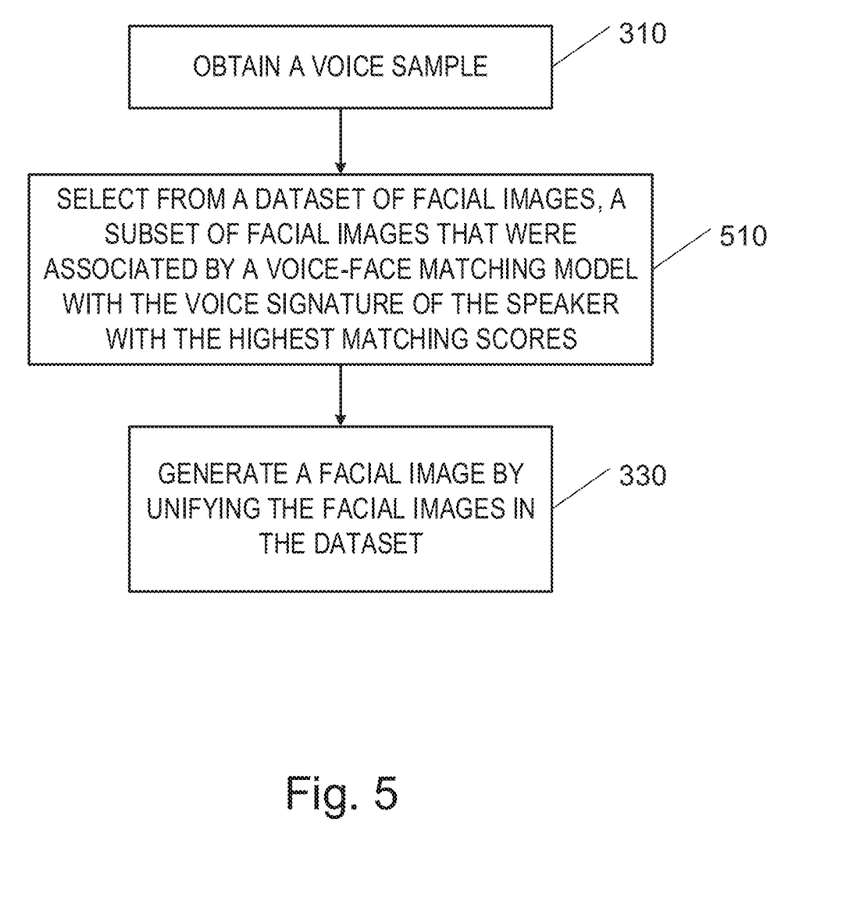
FIG. 5, which is a flowchart of a method for reconstructing a facial image of a speaker from a sample of the speaker's voice using a voice-face matching model, according to embodiments of the invention.

Reference is now made to FIG. 5, which is a flowchart of a method for creating, generating or reconstructing a facial image of a speaker from a sample of the speaker's voice using a voice-face matching model, according to embodiments of the invention. While in some embodiments the operations of FIG. 5 are carried out using systems as shown in FIGS. 1 and 7, in other embodiments other systems and equipment can be used. Some operations of embodiments of the method presented in FIG. 5 are similar to operations presented in FIGS. 3 and 4. These operations will be given the same reference numerals and will not be described again in detail.

In operation 510, a processor, e.g., processor 705 depicted in FIG. 7, may select from a dataset of facial images, a subset of facial images that were associated by a voice-face matching model (e.g., such as voice-face matching network 230 depicted in FIG. 2) with the voice signature of the speaker with the highest matching scores. For example, the processor may provide the voice sample of the speaker, obtained in operation 310, as well as images form the dataset to the voice-face matching model. The voice-face matching model may generate a latent space vector for the voice sample and for an examined facial image. The latent space vector may include a reduced dimension (e.g., compressed) representation of the original data, e.g., the voice sample of the examined image, generated for example by an ML model or an encoder. The latent space vector may include a vector (e.g., an ordered list of values) that represents the original data in a compressed form that, if generated properly, includes important or significant components or characteristics of the raw data. The voice-face matching model may calculate a rank, a score or a grade indicative of the probability that the voice sample and the facial image belong to the same person, and may select the facial images that provides the highest scores, e.g., the top N ranked facial images or facial images with a rank that satisfies a threshold. In operation 330 the processor may unify the selected images using a face fusing techniques to generate an estimated facial image of the speaker.

Figure 6:
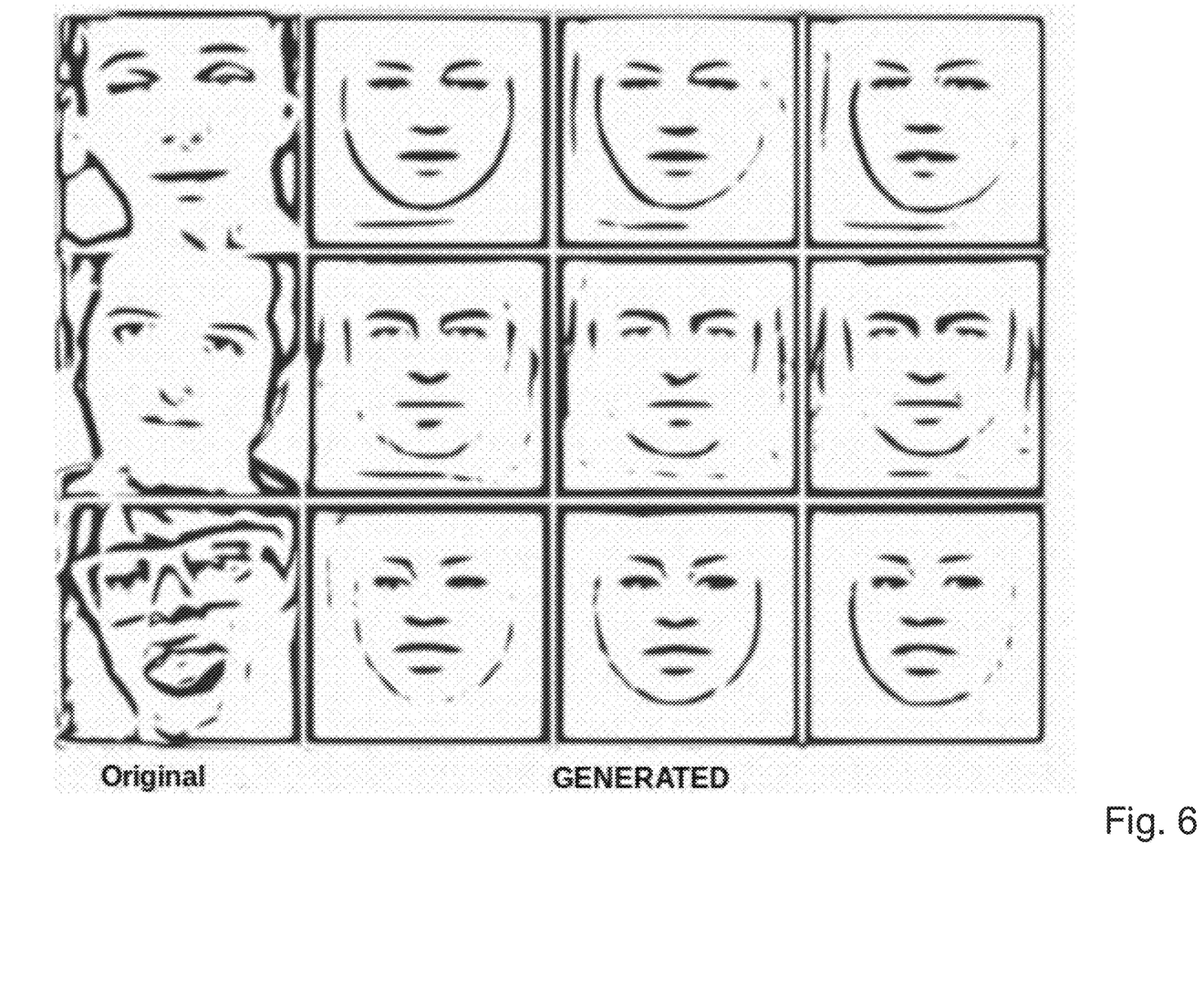
FIG. 6 depicts test results obtained in a proof-of-concept experiment performed according to embodiments of the invention.

FIG. 6 depicts test results obtained in a proof-of-concept experiment performed according to embodiments of the invention. The setup included audio-image pairs that were extracted from the public video dataset VoxCeleb2. Voice signatures were generated using SpeechBrain's implementation of ECAPA-TDNN embeddings, and fusion was performed using face averaging implementation from Facer repository. For each speaker in the dataset, two voice signatures were generated and averaged to generate the voice signature of the speaker in the dataset. The top five speakers from the dataset with the highest cosine similarity between their averaged voice signature and voice signature of the input voice sample were selected. 20 random images were selected for the speakers selected from the dataset. The entire set of 20 images of five selected speakers from the dataset were averaged. Column #1 of FIG. 6 depicts the real face of the speaker and columns #2-4 depict faces generated with the abovementioned approach. In this example, each column of columns #2-4 was generated by averaging different images of the same selected speakers from the dataset (the dataset may include several images of the same speaker).

FIG. 7 shows a high-level block diagram of an exemplary computing device which may be used with embodiments of the present invention. Computing device 700 may include a controller or processor 705 that may be or include, for example, one or more central processing unit processor(s) (CPU), one or more Graphics Processing Unit(s) (GPU), a chip or any suitable computing or computational device, an operating system 715, a memory 720, a storage 730, input devices 735 and output devices 740. Each of modules and equipment such as voice encoder 130, comparison module 160, face fusion model 180 and voice-face matching model 230, as shown in FIGS. 1 and 2 and other modules or equipment mentioned herein may be or include, or may be executed by, a computing device such as included in FIG. 7 or specific components of FIG. 7, although various units among these entities may be combined into one computing device.

Operating system 715 may be or may include any code segment designed and/or configured to perform tasks involving coordination, scheduling, supervising, controlling or otherwise managing operation of computing device 700, for example, scheduling execution of programs. Memory 720 may be or may include, for example, a Random Access Memory (RAM), a read only memory (ROM), a Dynamic RAM (DRAM), a volatile memory, a non-volatile memory, a cache memory, or other suitable memory units or storage units. Memory 720 may be or may include a plurality of possibly different memory units. Memory 720 may store for example, instructions to carry out a method (e.g., code 725), and/or data such as model weights, etc.

Executable code 725 may be any executable code, e.g., an application, a program, a process, task or script. Executable code 725 may be executed by processor 705 possibly under control of operating system 715. For example, executable code 725 may when executed carry out methods according to embodiments of the present invention. For the various modules and functions described herein, one or more computing devices 700 or components of computing device 700 may be used. One or more processor(s) 705 may be configured to carry out embodiments of the present invention by for example executing software or code.

Storage 730 may be or may include, for example, a hard disk drive, a floppy disk drive, a Compact Disk (CD) drive, or other suitable removable and/or fixed storage unit. Data such as instructions, code, video, images, voice samples, model weights and parameters etc. may be stored in a storage 730 and may be loaded from storage 730 into a memory 720 where it may be processed by processor 705. Some of the components shown in FIG. 7 may be omitted.

Input devices 735 may be or may include for example a mouse, a keyboard, a touch screen or pad or any suitable input device. Any suitable number of input devices may be operatively connected to computing device 700 as shown by block 735. Output devices 740 may include displays, speakers and/or any other suitable output devices. Any suitable number of output devices may be operatively connected to computing device 700 as shown by block 740. Any applicable input/output (I/O) devices may be connected to computing device 700, for example, a modem, printer or facsimile machine, a universal serial bus (USB) device or external hard drive may be included in input devices 735 or output devices 740. Network interface 750 may enable device 700 to communicate with one or more other computers or networks. For example, network interface 750 may include a wired or wireless NIC.

Embodiments of the invention may include one or more article(s) (e.g. memory 720 or storage 730) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention may be embodied in other specific forms using other details without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein. In some cases well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" can include, for example, "multiple" or "two or more". The term set when used herein can include one or more items. Unless explicitly stated, the method embodiments described herein are not constrained to a particular order sequence. Additionally, some of the described method embodiments or elements thereof can occur or be performed simultaneously, at the same point in time, or concurrently.

The invention claimed is:

1. A method for reconstructing a facial image of a speaker from a voice sample of the speaker, the method comprising:
   using a voice-face matching model, selecting from a dataset of facial images, a subset of facial images that were associated by the voice-face matching model with the voice sample of the speaker with the highest matching scores, wherein the voice-face matching model is trained to calculate a matching score indicative of the probability that the voice sample and the facial image belong to the same person, by:
      generating a facial latent space vector for each facial image in the dataset of facial images, and a voice latent vector for the voice sample of the speaker; and
      calculating the matching score between each of the facial latent space vectors and the voice latent vector; and
   reconstructing the facial image of the speaker by unifying the facial images in the subset, to generate a single morphed image.

2. The method of claim 1, wherein the voice-face matching model comprises an existing network.

3. The method of claim 1, wherein unifying the facial images in the subset is performed using a face fusion model.

4. The method of claim 1, wherein selecting the subset of facial images comprises selecting the facial images with matching scores above a threshold.

5. The method of claim 1, wherein selecting the subset of facial images comprises ordering the facial images based on the matching scores and selecting facial images with the highest matching scores.

6. A system for reconstructing a facial image of a speaker from a sample of the speaker's voice, the system comprising:
   a memory; and
   a processor configured to:
   use a voice-face matching model, selecting from a dataset of facial images, a subset of facial images that were associated by the voice-face matching model with the voice sample of the speaker with the highest matching scores, wherein the voice-face matching model is trained to calculate a matching score indicative of the probability that the voice sample and the facial image belong to the same person, by:
      generating a facial latent space vector for each facial image in the dataset of facial images, and a voice latent vector for the voice sample of the speaker; and
      calculating the matching score between each of the facial latent space vectors and the voice latent vector; and
   reconstruct the facial image of the speaker by unifying the facial images in the subset, to generate a single morphed image.

7. The system of claim 6, wherein the processor is configured to unify the faces using a face fusion model.

8. The system of claim 6, wherein the processor is configured to select the subset of facial images with a matching score that satisfies a threshold.

9. The system of claim 6, wherein the processor is configured to select the subset of facial images based on the matching scores by ordering facial images based on the matching scores and selecting the facial images with the highest matching scores.

10. The system of claim 6, wherein the voice-face matching model comprises an existing network.

* * * * *